United States Patent
Yang et al.

(10) Patent No.: US 12,055,621 B2
(45) Date of Patent: Aug. 6, 2024

(54) DETERMINING THE ORIENTATION OF OBJECTS USING RADAR OR THROUGH THE USE OF ELECTROMAGNETIC INTERROGATION RADIATION

(71) Applicant: Robert Bosch GmbH, Stuttgart (DE)

(72) Inventors: Chun Yang, Budapest (HU); Sebastian Muenzner, Stuttgart (DE); Fabian Timm, Renningen (DE); Jasmin Ebert, Heidelberg (DE); Zoltan Karasz, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 553 days.

(21) Appl. No.: 17/280,691

(22) PCT Filed: Dec. 17, 2019

(86) PCT No.: PCT/EP2019/085622
§ 371 (c)(1),
(2) Date: Mar. 26, 2021

(87) PCT Pub. No.: WO2020/127245
PCT Pub. Date: Jun. 25, 2020

(65) Prior Publication Data
US 2022/0003860 A1 Jan. 6, 2022

(30) Foreign Application Priority Data

Dec. 20, 2018 (DE) .......................... 102018222672.5

(51) Int. Cl.
*G01S 13/68* (2006.01)
*G01S 7/41* (2006.01)
(Continued)

(52) U.S. Cl.
CPC .............. *G01S 13/68* (2013.01); *G01S 7/415* (2013.01); *G01S 7/417* (2013.01); *G01S 13/42* (2013.01);
(Continued)

(58) Field of Classification Search
None
See application file for complete search history.

(56) References Cited

U.S. PATENT DOCUMENTS

| 8,682,821 B2 | 3/2014 | Benitez et al. |
| 2016/0084944 A1 | 3/2016 | Bialer et al. |

(Continued)

FOREIGN PATENT DOCUMENTS

| EP | 3339884 A1 | 6/2018 |
| JP | 2008062873 A | 3/2008 |

(Continued)

OTHER PUBLICATIONS

Kellner, et al.: "Instantaneous Lateral Velocity Estimation of a Vehicle using Doppler Radar", Proceedings of the 16th International Conference on Information FUSION, Turkey, (2013), pp. 877-884.

(Continued)

*Primary Examiner* — Whitney Moore
(74) *Attorney, Agent, or Firm* — NORTON ROSE FULBRIGHT US LLP; Gerard A. Messina

(57) ABSTRACT

A method for determining the spatial orientation of an object from at least one measuring signal which includes the response of the object to electromagnetic interrogation radiation. A method for predicting the trajectory of at least one object from at least one measuring signal which includes the response of the object to electromagnetic interrogation radiation, in conjunction with a scalar velocity of the object. A method for training a classifier and/or a regressor.

9 Claims, 6 Drawing Sheets

(51) Int. Cl.
*G01S 13/42* (2006.01)
*G01S 13/931* (2020.01)

(52) U.S. Cl.
CPC ..... *G01S 13/931* (2013.01); *G01S 2013/9318* (2020.01)

(56) References Cited

U.S. PATENT DOCUMENTS

2018/0032078 A1* 2/2018 Ferguson ............... G06V 20/58
2018/0067194 A1    3/2018 Wodrich et al.

FOREIGN PATENT DOCUMENTS

JP    2010044461 A    2/2010
JP    2011018166 A    1/2011

OTHER PUBLICATIONS

International Search Report for PCT/EP2019/085622, Issued Mar. 6, 2020.

Roos, Fabian, et al., "Estimation of the Orientation of Vehicles in High-Resolution Radar Images," 2015 IEEE MTT-S International Conference on Microwaves for Intelligent Mobility (ICMIM ), IEEE, 2015, pp. 1-5. <https://oparu.uni-ulm.de/xmlui/bitstream/handle/123456789/6270/oparu.pdf?sequence=1&isAllowed=y> Downloaded Mar. 26, 2021.

* cited by examiner

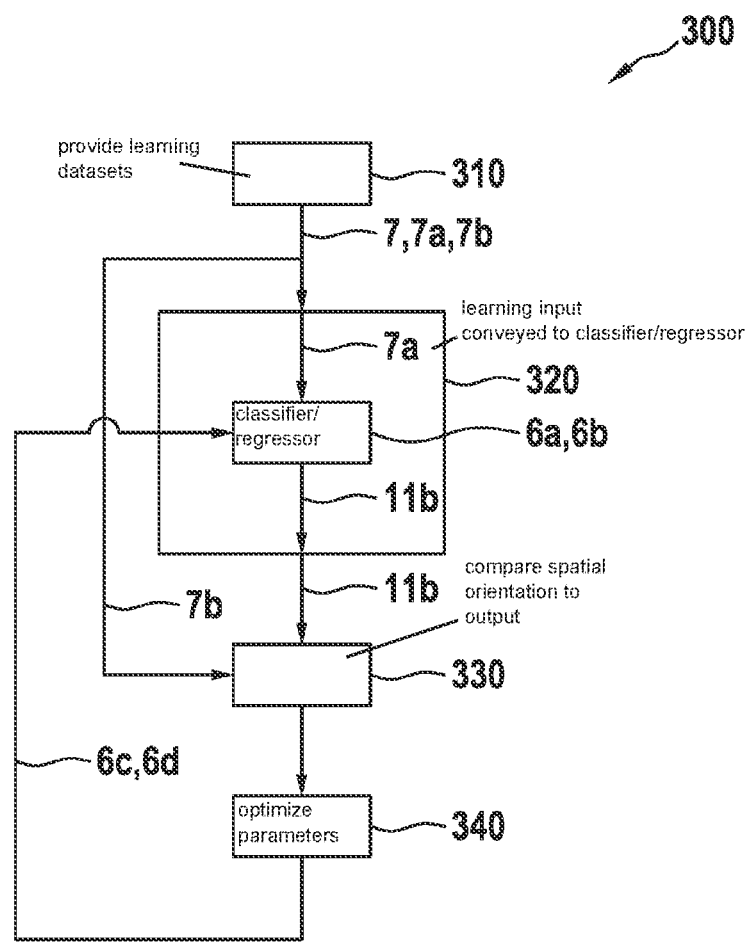

DETERMINING THE ORIENTATION OF OBJECTS USING RADAR OR THROUGH THE USE OF ELECTROMAGNETIC INTERROGATION RADIATION

FIELD

The present invention relates to the detection and monitoring of objects in a detection range based on a response of these objects to electromagnetic interrogation radiation.

BACKGROUND INFORMATION

To ensure that a vehicle is able to move in road traffic in an at least partially automated manner, the environment of the vehicle has to be detected and countermeasures have to be initiated if a collision with an object in the environment of the vehicle is looming. The preparation of an environment representation and a localization are also necessary for safe automated driving.

The detection of objects with the aid of radar is independent of the light conditions and, for example, also possible at night at a greater distance without the oncoming traffic being disturbed by the high beam. In addition, the distance and velocity of objects can be directly derived from the radar data. This information is important for the assessment of whether a collision with the objects might occur. However, the type of object involved is unable to be gathered directly from the sensor signals. This detection is currently achieved by calculating attributes from the digital signal processing.

U.S. Pat. No. 8,682,821 B2 describes a classification of radar signals with regard to whether they are caused by the movement of certain objects or non-human animals, this being accomplished with the aid of machine learning. This knowledge can be utilized for avoiding false alarms when monitoring a region for human intruders, or also for selecting the correct action for a collision avoidance during at least partially automated driving.

SUMMARY

Within the scope of the present invention, a method for determining the spatial orientation of an object from at least one measuring signal which includes the response of the object to electromagnetic interrogation radiation is provided. In particular, this response may include a reflection of the interrogation radiation.

In this method, in accordance with an example embodiment of the present invention, an at least two-dimensional representation of the spatial distribution of contributions made to the measuring signal by different locations on the object is ascertained from the measuring signal. Based on this representation, the spatial orientation of the object is ascertained by a classifier and/or a regressor.

The measuring signal may have been detected by one or more detector(s). That is to say, it may involve a total measuring signal, which was aggregated from the raw data supplied by the multiplicity of detectors, for example. In addition, prior to forming the representation, the measuring signal may have passed through one or more stage(s) of signal processing.

A classifier, for instance, may subdivide a spatial orientation, expressed as an angle between 0° and 360°, into discrete intervals and ascertain confidences for each input representation of the spatial distribution of contributions based on which the representation is to be allocated to each of the possible intervals of the orientation. A regressor may indicate the most likely spatial orientation in terms of an angle without being restricted to discrete intervals in this context.

The electromagnetic interrogation radiation can be radar radiation, for example. Commercially obtainable radar sensors for monitoring a space region include one or more transmitter(s) for the radar radiation as well as quite frequently an array of multiple receive antennas which may be used to determine, without mechanical movement of this array, the direction from which the reflected radar radiation is incident ("direction of arrival", DOA). The radar sensors normally do not output the raw data supplied by the receive antennas but extract reflections from these raw data. For each reflection, at least an angular position of the reflection, at least an intensity of the reflection as well as at least a distance to the location of the reflection are normally evaluated.

It has now been recognized that combining the raw data into reflections constitutes a considerable simplification in which in particular the spatial extension of a detected object is greatly abstracted. The object turns into one or more discrete source(s) of punctiform locations from which a response emanates with the acquired intensity of the reflection. In reality, however, a large electromagnetic wave front impinges upon a large object. According to the Huygens principle, each infinitesimal location on the surface of the object is the starting point of an isotropic elementary wave, and the response of the object to the electromagnetic interrogation radiation is formed by a superposition of all of these elementary waves.

Therefore, the spatial distribution of the contributions made by different locations on the object to the measuring signal ascertained according to the present method, ultimately constitutes a feedback of the measured response of the object to its physical source.

This distribution changes when there is a change in the spatial orientation of the object relative to the measuring system. Thus, without obstruction, the interrogation radiation can reach only the particular locations on the surface of the object that lie along a line of sight to the transmitter. In addition, the spatial orientation of the object also determines the angle of incidence at which the interrogation radiation impinges upon the object at each location, and thus determines the phase relations between the elementary waves formed at the different locations.

As a result, the spatial orientation of the object is able to be ascertained through a classification and/or regression from a representation of the mentioned distribution of contributions.

For example, this representation may be a three-dimensional point cloud which allocates to locations in the three-dimensional space the physical contributions to the response emanating from them. However, the representation may also be a two-dimensional image, for instance, which uniquely results by projecting this point cloud onto a plane, or by some other assignment rule. For the desired determination of the spatial orientation of the object by a classification and/or regression from the representation, it is not decisive that the representation correctly produces an outline of the object, for example. It is merely important that two different spatial orientations of the object also manifest themselves in different representations.

It was furthermore recognized that the possibility of ascertaining the spatial orientation of objects obtained in the described manner improves the prediction of the trajectories of moving objects on the basis of observations using the electromagnetic interrogation radiation. For very many objects such as vehicles, the possible movement direction in the near future correlates with the spatial orientation of the object. For example, the vehicle may continue rolling along a driving direction specified by its longitudinal axis or may carry out cornering by turning the steering wheel starting from this longitudinal axis. The minimum radius of curvature of such a curve is predefined by the design of the vehicle, e.g., its wheelbase. However, it is impossible for the vehicle to move on its own exactly perpendicular to its longitudinal axis, for instance.

For example, if a detection range situated in front of an ego vehicle to be controlled or monitored is monitored with the aid of radar radiation, then it can at least be narrowed down, based on the spatial orientation of another vehicle detected in the detection range, in which directions this vehicle is able to move in the near future. This information is important for the assessment of whether the other vehicle is possibly on a potential collision course with the ego vehicle.

As described above, radar radiation is thus selected as the electromagnetic interrogation radiation in one particularly advantageous embodiment. It is also possible to use light that is scanned across a detection range within the framework of a LIDAR method (light detection and ranging), for example. However, this scanning recording of the measuring signal makes the reconstruction of the spatial distribution more difficult in comparison with a measurement using radar radiation.

As described above, the measuring signal advantageously includes datasets regarding reflections of the electromagnetic interrogation radiation, and each of these datasets includes:
  at least an angular position of the reflection (e.g., azimuth and/or elevation),
  at least an intensity of the reflection as well as
  at least a distance to the location of the reflection.

The ascertainment of the spatial distribution of contributions may become more precise if a processing stage of the measuring signal that has been subjected to a lesser degree of abstraction and simplification in comparison with the raw data is used for this purpose. In particular, it is also possible, for instance, to ascertain the representation of the spatial distribution directly from the raw data supplied by one or more detector(s).

In one particularly advantageous embodiment of the present invention, based on the datasets regarding the reflections, a physical model is ascertained for converting the spatial distribution of contributions into the measuring signal. As described above, this model, for instance, may include a rule according to which contributions originating from different locations superpose to a resulting wave front which carries the response of the object. In addition, for example, the model may also include a rule according to which a wave front arriving at one or multiple detector(s) is processed into the measuring signal. The more detailed the model, the more precisely the spatial distribution of the contributions is able to be inferred from the measuring signal.

In a further, particularly advantageous embodiment of the present invention, a sinc function is set up for each reflection, whose peak level is defined by the intensity of the reflection, and whose position is defined by the angular position of the reflection as well as the distance to the location of the reflection. A sum across all established sinc functions is utilized for the ascertainment of the representation. This is based on the recognition that especially the output signals supplied by radar sensors include sinc functions in an internal processing stage, which are condensed to the mentioned information regarding reflections in a later processing stage. In the same way that sinc functions describe the superposition of elementary waves in the diffraction of a wave front at a gap, sinc functions are also suitable for describing the superposition of the contributions of multiple locations of the object regarding a certain reflection.

In an advantageous manner, in particular the 3-dB width of the sinc function is able to be specified based on the physical measuring accuracy of the measuring device that has supplied the measuring signal. For example, in particular different measuring accuracies at which different reflections had been determined are thereby able to be weighted against one another.

In a further, particularly advantageous embodiment of the present invention, an artificial neural network, ANN, and/or a support vector machine, SVM, is/are selected as classifier and/or regressor. The ANN and the SVM are among the classifiers and/or regressors that are trainable by machine learning. This means that a finite number of learning representations of the spatial distribution of contributions and associated spatial orientations of an object is able to be used for preparing the classifier or regressor for an infinite number of unknown situations. The catalog of the total number of possible representations of the spatial distribution of contributions is unable to be provided in advance because the multitude of possible objects (such as vehicle types) is incalculable.

In a further, particularly advantageous embodiment of the present invention, the type of object is preclassified based on a physical observation of the object. The classifier and/or regressor used for determining the spatial orientation can then be selected based on this type. For example, trucks have a completely different shape than passenger cars, which means that the spatial distributions of contributions made by locations on these vehicles to a measuring signal from the same angle in the interrogation by interrogation radiation differ accordingly.

As described above, the ascertained spatial orientation of a moving object may particularly be used to predict the future continuation of the movement. For instance, this applies especially when the same electromagnetic interrogation radiation (such as radar radiation) is used also for ascertaining the velocity of the moving object. This velocity shifts the frequency of the response in relation to the frequency of the irradiated interrogation radiation by a Doppler phase shift and can therefore be measured by evaluating the frequency of the response. However, the velocity ascertained in this way is a scalar quantity. This means that it merely indicates how fast the object is approaching the measuring device or how fast the object is moving away from the measuring device. Many different movements of the object relative to the measuring device may now be compatible with the same scalar velocity. By measuring the spatial orientation of the object using the above-described method, the ambiguity with regard to the future trajectory of the moving object is at least partially able to be resolved.

The present invention therefore also relates to a method for predicting the trajectory of at least one object from at least one measuring signal which includes the response of the object to electromagnetic interrogation radiation, in conjunction with a scalar velocity v of the object.

In this method, in accordance with an example embodiment of the present invention, the position of the object is ascertained from the measuring signal. The spatial orientation of the object is ascertained using the above-described method. Starting from the position of the object, the trajectory of the object is updated utilizing scalar velocity v based on the spatial orientation of the object.

In this context, "based on" in the case of a vehicle as an object may mean that the possible future driving directions of the vehicle are specified by a longitudinal axis of the vehicle, which may be gathered from the spatial orientation of the vehicle, as well as by the possible steering maneuvers leading away from this axis. Depending on the time horizon for the updating, however, it may also be sufficient to consider the current longitudinal axis of the vehicle, for instance.

As described above, scalar velocity v in particular is able to be ascertained in an advantageous manner from a Doppler frequency shift of the electromagnetic interrogation radiation.

In a further, particularly advantageous embodiment of the present invention, the predicted trajectory of the object is compared to a currently traveled trajectory and/or to a planned trajectory of a vehicle to be monitored and/or controlled. In this way it can especially be recognized whether there is a risk that the trajectory of the monitored object is tangent to the trajectory currently driven by or the planned trajectory of the own vehicle. Such a tangency points to a collision risk.

In a further, especially advantageous embodiment of the present invention, the response that the projected trajectory of the object is tangent to the currently traveled trajectory or to the planned trajectory of the vehicle causes the actuation of a physical warning device of the vehicle that the driver of the vehicle is able to perceive. As an alternative, or also in combination therewith, a steering system, a drive system, and/or a brake system of the vehicle is/are actuated such that the new trajectory of the vehicle then is no longer tangent to the predicted trajectory of the object.

Especially when radar radiation is used as the electromagnetic interrogation radiation, a collision risk at night, for example, is able to be detected in a timelier manner and the collision risk be reduced by the mentioned interventions than would be possible for a human driver based on his or her visual observations within the range of the low beam.

As mentioned above, in particular a classifier and/or a regressor trainable by machine learning may be used in the above-described methods. Therefore, the present invention also relates to a method for training a classifier and/or regressor for use in one of the above-described methods.

In this method, in accordance with an example embodiment of the present invention, a learning set of learning datasets is provided. These learning datasets include as learning input an at least two-dimensional representation of the spatial distributions of the contributions of different locations on the object to a measuring signal which includes the response of the object to electromagnetic interrogation radiation. The learning datasets furthermore include as learning output the spatial orientation that was present during the measurement.

Parameters specify the behavior of the classifier and/or the regressor. In an ANN, the parameters may be weights, for example, by which the inputs of each neuron are calculated for an activation of this neuron.

For each learning dataset, the respective learning input is conveyed to the classifier and/or the regressor. The spatial orientation of the object output by the classifier and/or the regressor is compared to the learning output associated with the learning input. The parameters of the classifier and/or the regressor are optimized to the effect that the classifier and/or the regressor map(s) the learning inputs included in the learning set to the associated learning outputs with at least a predefined accuracy according to the specification of an error function.

As described above, the classifier and/or the regressor is/are thereby able to be prepared for an infinite number of new situations based on a finite number of learning situations.

As described above, the sensor hardware used for recording the measuring signal may advantageously be modified such that it provides an interface for the output of more detailed information than the information regarding reflections normally output at present. However, the methods basically also manage with the currently provided information, i.e. without a modification of the hardware. They may especially be implemented in a software that provides the direct customer benefit that the spatial orientation of the object or the future trajectory of the object can be ascertained more precisely than currently possible. Therefore, the present invention also relates to a computer program which includes machine-readable instructions that, when executed on a computer and/or on a control unit, induce the computer and/or on the control unit to carry out one of the described methods. In the same way, the present invention also relates to a machine-readable data carrier or a download product having the computer product.

Additional measures that improve the present invention will be illustrated in greater detail below with the aid of figures together with the description of the preferred exemplary embodiments of the present invention.

BRIEF DESCRIPTION OF THE DRAWINGS

FIG. 6 shows an exemplary embodiment of method 300, in accordance with the present invention.

DETAILED DESCRIPTION OF EXAMPLE EMBODIMENTS

Figure 1:
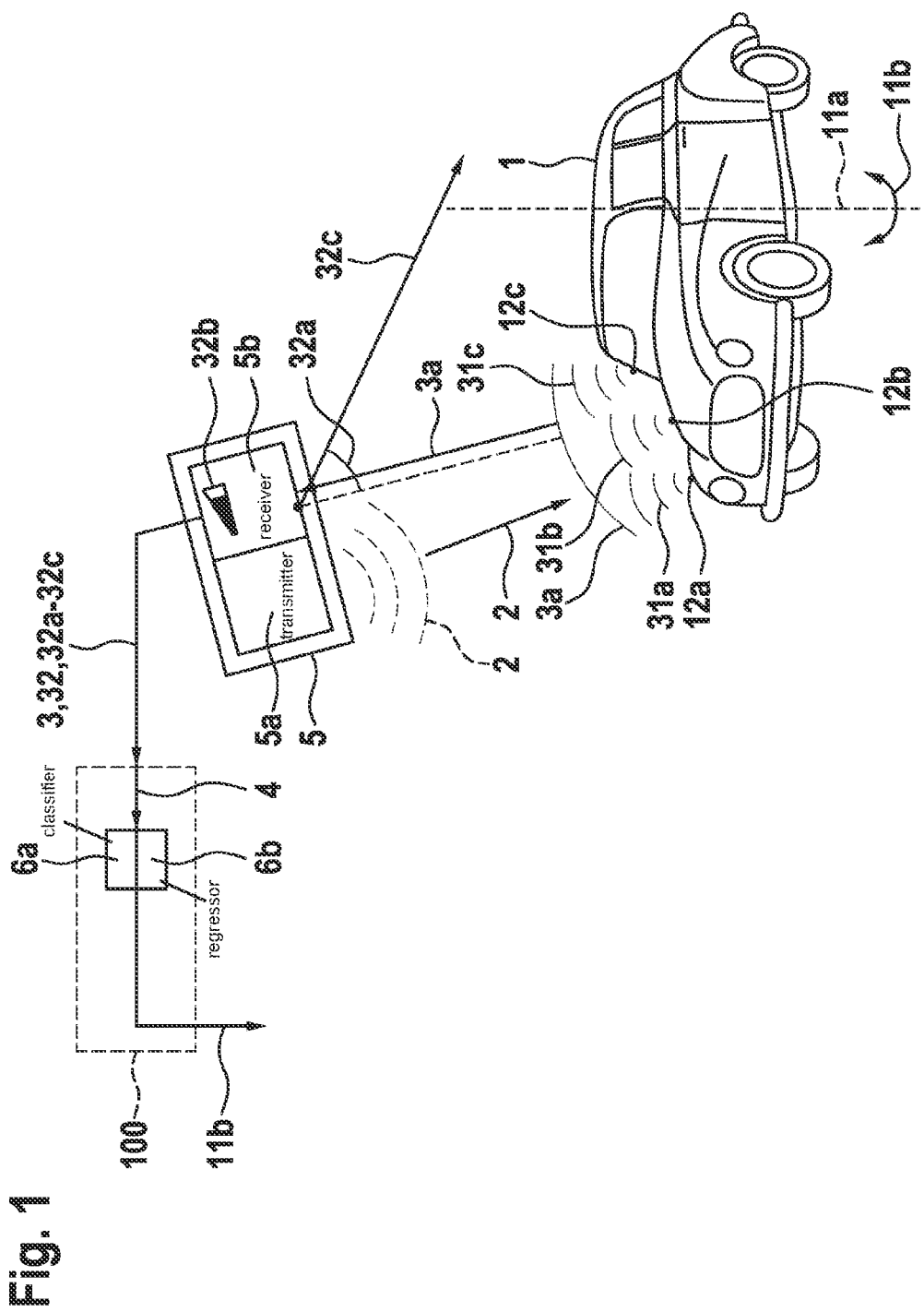
FIG. 1 shows an exemplary superposition of different contributions 31a-31c to a response 3a to electromagnetic interrogation radiation 2.

FIG. 1 shows an exemplary situation in which a large-scale object 1 forms a response 3a to electromagnetic interrogation radiation 2. Used measuring device 5 includes a transmitter 5a for interrogation radiation 2 and a receiver 5b for response 3a of object 1. In the example illustrated in FIG. 1, object 1 is a vehicle which is located in a position 11a and assumes a spatial orientation 11b in the form of a rotational angle in relation to an axis perpendicularly running through object 1. Using various elements (not depicted in FIG. 1), measuring device 5 extracts reflections 32 from the raw data recorded by receiver 5a and outputs these reflections 32 as measuring signal 3. More specifically, at least an angular position 32a, at least an intensity 32b, and at least a distance 32c to the location of reflection 32 are acquired regarding reflections 32.

With the aid of method 100, spatial orientation 11b of object 1 is analyzed based on measuring signal 3. For this purpose, method 100 utilizes that each location 12a-12c on object 1 responds to electromagnetic interrogation radiation 2 by its own contribution 31a-31c and that these contributions 31a-31c superpose to form total response 3a. An at least two-dimensional representation 4 of the spatial distribution of these contributions 31a-31c is evaluated based on measuring signal 3 and the desired spatial orientation 11b of object 1 is ascertained therefrom with the aid of classifier 6a and/or regressor 6b.

Figure 2:
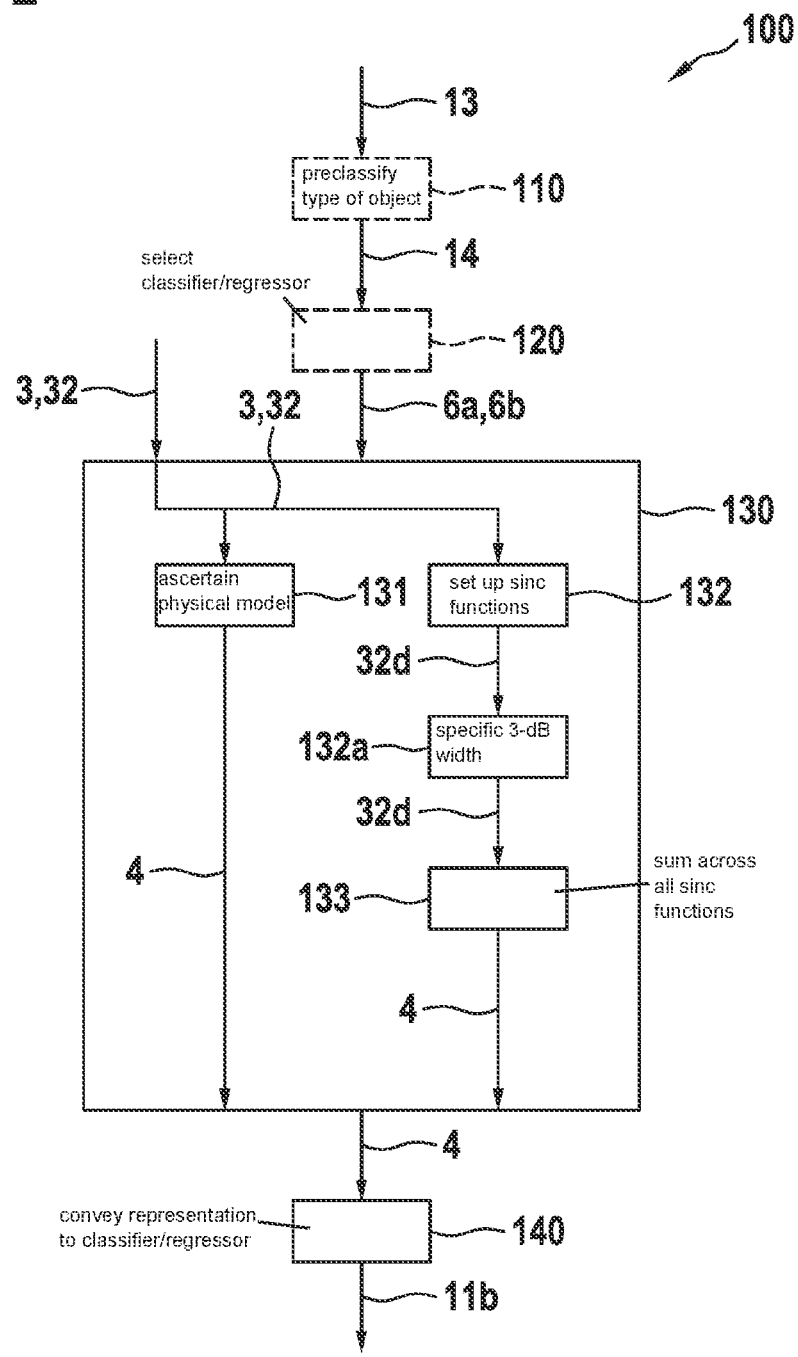
FIG. 2 shows exemplary embodiments of method 100, in accordance with the present invention.

This method 100 is shown in greater detail in FIG. 2. In optional step 110, the type 14 of object 1 is first preclassified based on a physical observation 13 of object 1. Physical observation 13 may in particular be entirely or partially congruent with measuring data 3. Based on type 14, classifier 6a and/or regressor 6b is/are selected in optional step 120.

Classifier 6a and/or regressor 6b is/are used in step 130 in order to evaluate spatial orientation 11b of object 1 based on measuring signal 3, 32.

For this purpose, a physical model for converting the spatial distribution of contributions 31a-31c into measuring signal 3 may be ascertained based on datasets regarding reflections 32 included in measuring signal 3 according to block 131. This model supplies a representation 4 of this particular distribution.

Alternatively or also in combination, according to block 132 it is possible to set up a sinc function 32d for each reflection 32. In the process, for example in particular according to block 132a, it is possible to specify the 3-dB width of sinc function 32d based on the physical measuring accuracy of measuring device 5 which has supplied measuring signal 3. According to block 133, a sum across the sinc functions 32d set up for all reflections 32 is utilized for ascertaining representation 4.

Regardless of the manner in which representation 4 was ultimately obtained, it is conveyed in step 140 to classifier 6a and/or regressor 6b, where it is further processed into the desired spatial orientation 11b of object 1.

Figure 3:
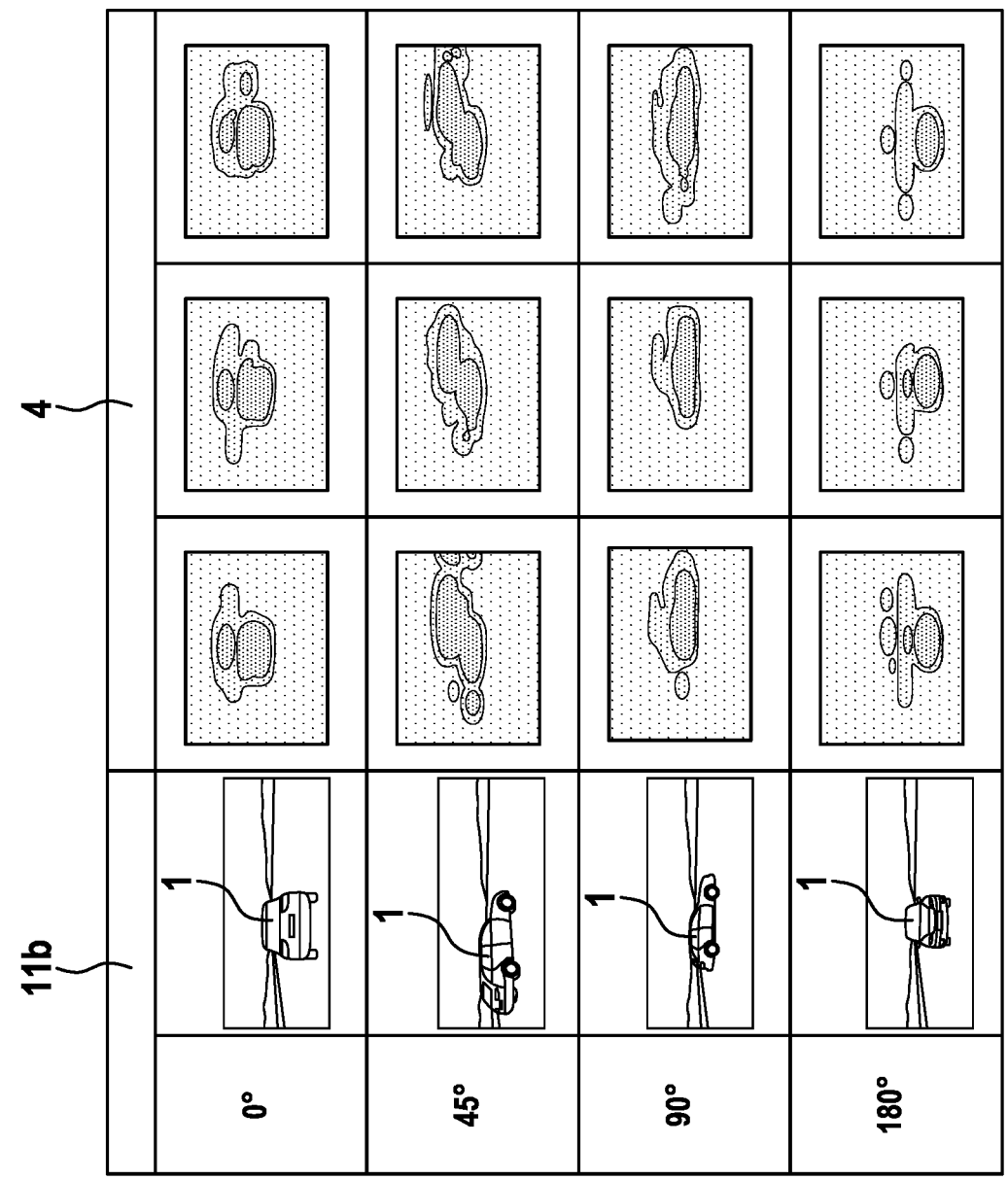
FIG. 3 shows exemplary representations 4 of the spatial distribution of contributions 31a-31c for different spatial orientations 11b of one and the same object 1.

FIG. 3 schematically shows by way of example a few representations 4 obtained from measuring signals 3 for one and the same object 1 in different spatial orientations 11b. It is obvious here that representations 4 ascertained from multiple, sequentially recorded measurements differ slightly from one another even with a fixed spatial orientation 11b. The task of mapping all representations 4 to the respective correct spatial orientation 11b of object 1 nevertheless is achievable quite well with the aid of machine learning.

Figure 4:
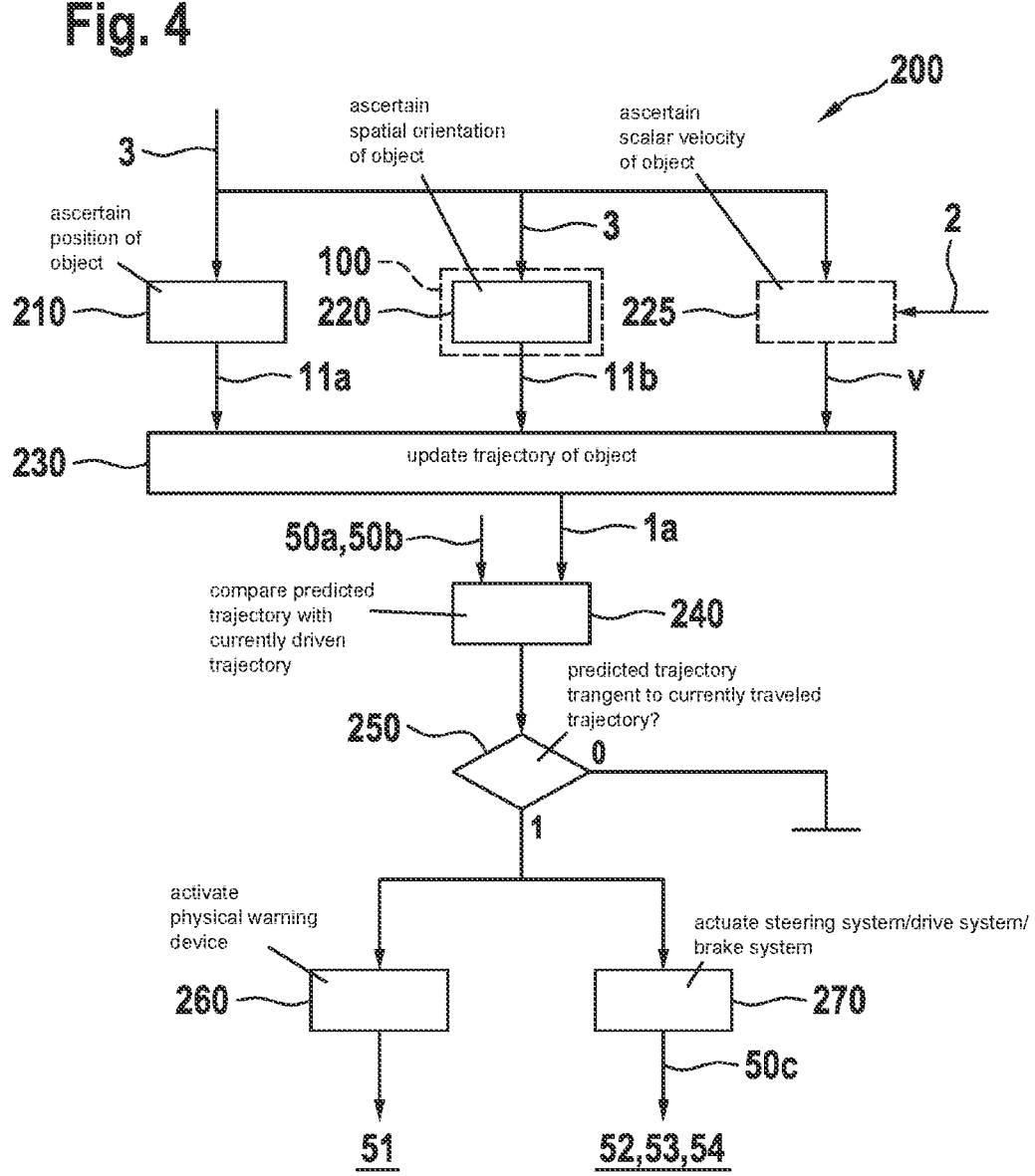
FIG. 4 shows an exemplary embodiment of method 200, in accordance with the present invention.

FIG. 4 shows an exemplary embodiment of method 200. From measuring signal 3, which includes response 3a of object 1 to electromagnetic interrogation radiation 2, position 11a of object 11 is ascertained in step 210. The same measuring signal 3 is used in step 220 for ascertaining spatial orientation 11b of object 1 with the aid of method 100. Measuring signal 100 is furthermore used in optional step 225 for ascertaining a scalar velocity v of object 1. The Doppler frequency shift in relation to the originally emitted electromagnetic interrogation radiation 2 is ascertained for this purpose.

In step 230, starting from position 11a, trajectory 1a of object 1 is updated utilizing scalar velocity v based on the previously ascertained spatial orientation 11b. Trajectory 1a of object 1 predicted in this manner is compared in step 240 to a currently driven trajectory 50a and/or with a planned trajectory 50b of a vehicle 50 to be monitored and/or controlled.

More specifically, it is checked in step 250 whether predicted trajectory 1a of object 1 is tangent to currently traveled trajectory 50a and/or planned trajectory 50b of vehicle 50, in particular intersects it, for example. If this is the case (truth value 1), then a physical warning device 51 of vehicle 50 that the driver of vehicle 50 is able to perceive is activated in step 260. As an alternative or also in combination therewith, a steering system 52, a drive system 53, and/or a brake system 54 of vehicle 50 is/are able to be actuated in step 270 such that the vehicle travels a new trajectory 50c, which is no longer tangent to predicted trajectory 1a of object 1.

Figure 5:
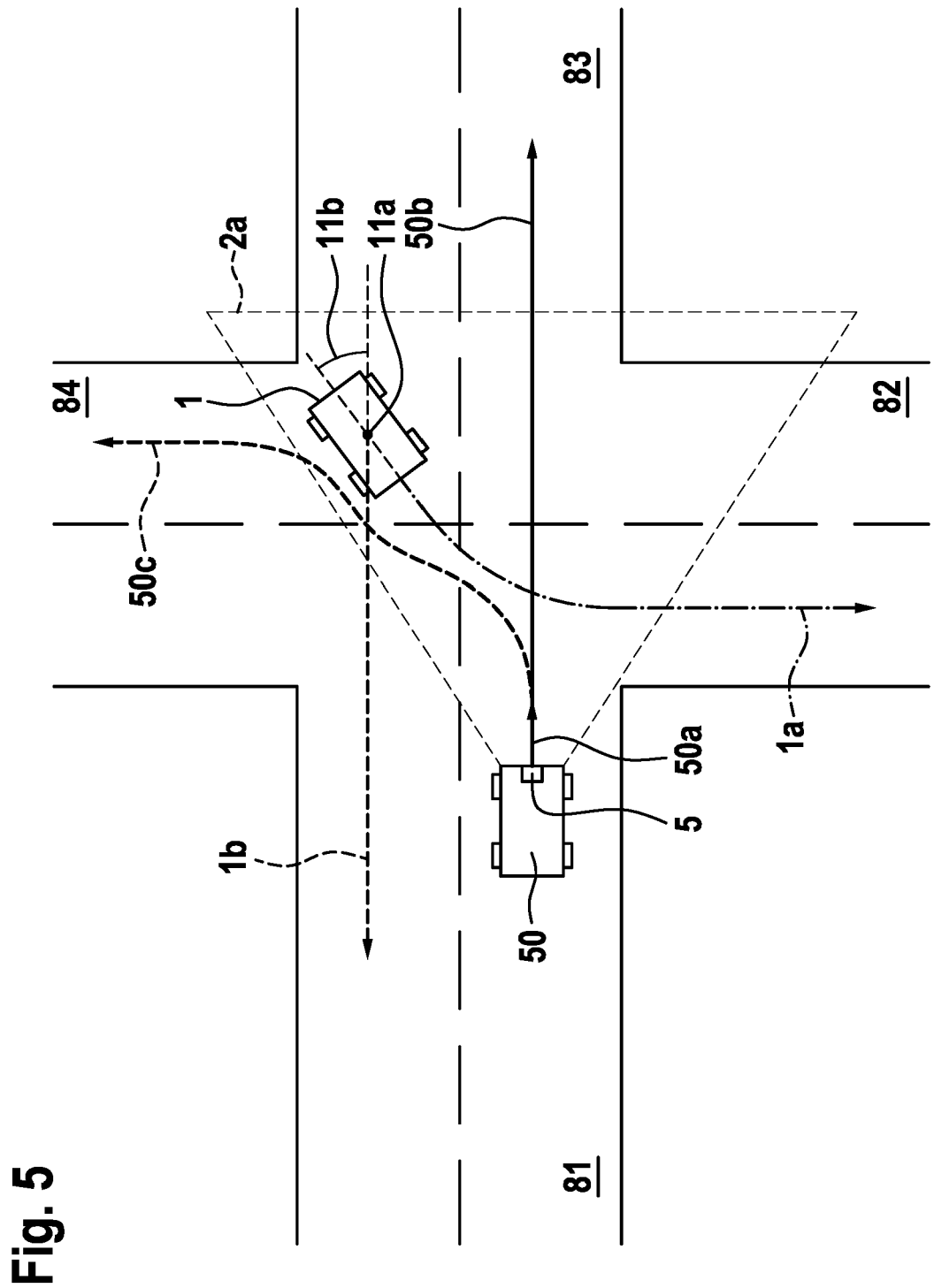
FIG. 5 show an exemplary application situation for method 200 at an intersection of four roads 81, 82, 83, 84.

One application example for method 200 is outlined in FIG. 5. In the scenario illustrated in FIG. 5, a vehicle 50 to be controlled approaches an intersection with three further roads 82, 83, and 84 on a road 81. Vehicle 50 is currently traveling on trajectory 50a. It is planned that vehicle 50 continues its travel in a straight line along trajectory 50b in the direction of road 83.

Using a measuring device 5, vehicle 50 is monitoring a detection range 2a. For this purpose, measuring device 5 emits electromagnetic interrogation radiation into detection range 2a and receives a response 3a from there.

In the situation illustrated in FIG. 5, another vehicle is registered as object 1 in position 11a in detection range 2a. It is also registered that other vehicle 1 is approaching ego vehicle 50 at a scalar velocity v. However, it is impossible to ascertain the probable intention of other vehicle 1 on this basis. It may be that the driver of other vehicle 1 has not noticed ego vehicle 50 and intends to make a left turn into road 82. In such a case, trajectory 1a of other vehicle 1 would be tangent to planned trajectory 50b of ego vehicle 50, which means that a collision could occur. However, in the same way is also possible that the driver of other vehicle 1 intends to travel straight ahead along trajectory 1b onto road 81. In this case, there would be no conflict with ego vehicle 50.

Within the framework of above-described method 200, spatial orientation 11b of other vehicle 1 is additionally ascertained from measuring data 3 recorded by measuring device 5, and this spatial orientation 11b is utilized for updating trajectory 1a of other vehicle 1 starting from its current position 11a.

In the example illustrated in FIG. 5, it can be gathered from spatial orientation 11b of other vehicle 1 that this vehicle 1 is most likely going to follow trajectory 1a leading in the direction of road 82. For this reason, a countermeasure is initiated in order to avoid a collision. In the example illustrated in FIG. 5, an evasion trajectory 50c is determined along which ego vehicle 50 makes a turn onto road 84.

The example illustrates that it is desirable to predict the intention of other vehicle 1 with some degree of certainty. For if the true intention of vehicle 1 consisted of continued travel on trajectory 1b in the direction of road 81, then the evasion along trajectory 50c would be precisely the wrong reaction of ego vehicle 50, and a collision could occur.

FIG. 6 shows an exemplary embodiment of method 300 for training classifier 6a and/or regressor 6b. In step 310, a learning set of learning datasets 7 is provided, which include the above-described representation 4 as learning input 7a and spatial orientation 11b of the object in the underlying measurement as learning output 7b in each case.

In step 320, learning input 7a is conveyed to classifier 6a and/or regressor 6b. In step 330, spatial orientation 11b of object 1 output by classifier 6a and/or regressor 6b is compared to learning output 7b. In step 340, parameters 6c, 6d of classifier 6a and/or of regressor 6b are optimized in such a way that learning inputs 7a are mapped as correctly as possible onto learning outputs 7b across the entire learning set.

What is claimed is:

1. A method for determining a spatial orientation of an object from at least one measuring signal which includes a response of the object to electromagnetic interrogation radiation, the method comprising the following steps:
   ascertaining an at least two-dimensional representation of a spatial distribution of contributions made to the measuring signal by different locations on the object;
   ascertaining, by a classifier and/or a regressor, the spatial orientation of the object based on the representations;
   predicting a trajectory of the object using the ascertained spatial orientation of the object,
   comparing the predicted trajectory of the object to a currently traveled trajectory and/or planned trajectory of the vehicle to be monitored and/or controlled; and
   in response to the predicted trajectory of the object being tangent to the currently traveled trajectory and/or to the planned trajectory of the vehicle:
      actuating a physical warning device of the vehicle which a driver of the vehicle is able to perceive, and/or
      actuating a steering system, and/or a drive system, and/or a brake system, of the vehicle, in such a way that a new trajectory of the vehicle is no longer tangent to the predicted trajectory of the object;
   wherein the measuring signal includes datasets regarding reflections of the electromagnetic interrogation radiation, and each of the datasets includes at least an angular position of the reflection, at least an intensity of the reflection, and at least a distance to a location of the reflection;
   wherein a sinc function is established for each reflection of the reflections, a peak level of the sinc function being defined by the intensity of the reflection, and a position of the sine function is defined by the angular position of the reflection and the distance to the location of the reflection, and wherein a sum across all of the established sine functions is utilized for the ascertainment of the representation.

2. The method as recited in claim 1, wherein the electromagnetic interrogation radiation is radar radiation.

3. The method as recited in claim 1, wherein based on the datasets regarding the reflections, a physical model for converting the spatial distribution of contributions into the measuring signal is ascertained.

4. The method as recited in claim 1, wherein the classifier and/or the regressor is an artificial neural network and/or a support vector machine.

5. The method as recited in claim 1, wherein a type of the object is preclassified based on a physical observation of the object, and the classifier and/or the regressor is selected based on the type.

6. A method for predicting the trajectory of at least one object from at least one measuring signal which includes the response of the object to electromagnetic interrogation radiation, in conjunction with a scalar velocity of the object, the method comprising the following steps:
   ascertaining a position of the object from the measuring signal;
   ascertaining a spatial orientation of the object including:
      ascertaining an at least two-dimensional representation of a spatial distribution of contributions made to the measuring signal by different locations on the object, and
      ascertaining, by a classifier and/or a regressor, the spatial orientation of the object based on the representation; and
   updating the predicted trajectory on the object starting from the position of the object utilizing the scalar velocity based on the spatial orientation of the object;
   wherein the predicted trajectory of the object is compared to a currently traveled trajectory and/or planned trajectory of the vehicle to be monitored and/or controlled; and
   wherein in response to the predicted trajectory of the object being tangent to the currently traveled trajectory or to the planned trajectory of the vehicle:
   a physical warning device of the vehicle which a driver of the vehicle is able to perceive is actuated; and/or
   a steering system, and/or a drive system, and/or a brake system, of the vehicle is actuated in such a way that a new trajectory of the vehicle is no longer tangent to the predicted trajectory of the object;
   wherein the measuring signal includes datasets regarding reflections of the electromagnetic interrogation radiation, and each of the datasets includes at least an angular position of the reflection, at least an intensity of the reflection, and at least a distance to a location of the reflection;
   wherein a sinc function is established for each reflection of the reflections, a peak level of the sinc function being defined by the intensity of the reflection, and a position of the sinc function is defined by the angular position of the reflection and the distance to the location of the reflection, and wherein a sum across all of the established sinc functions is utilized for the ascertainment of the representation.

7. The method as recited in claim 6, wherein the scalar velocity is ascertained from a Doppler frequency shift of the electromagnetic interrogation radiation.

8. A method for training a classifier and/or regressor, comprising the following steps:
   training the classifier and/or regressor by:
      providing a learning set of learning datasets, each including:
         as a respective learning input, an at least two-dimensional representation of a spatial distribution of contributions of different locations on an object to a measuring signal which includes a response of the object to electromagnetic interrogation radiation, and
         as a respective learning output, a spatial orientation of the object during the measurement;
      for each of the learning datasets, conveying the respective learning input to the classifier and/or the regressor, a behavior of the classifier and/or the regressor being specified by a set of parameters;
      comparing a spatial orientation of the object output by the classifier and/or the regressor to the respective learning output associated with the learning input; and
      optimizing the parameters of the classifier and/or the regressor to the effect that the classifier and/or the regressor maps the learning inputs included in the learning set to the learning outputs at least with a predefined accuracy according to a specification of an error function.

9. A non-transitory machine-readable medium on which is stored a computer program for determining a spatial orientation of an object from at least one measuring signal which includes a response of the object to electromagnetic interrogation radiation, the computer program, when executed by a computer, causing the computer to perform the following steps:
  ascertaining an at least two-dimensional representation of a spatial distribution of contributions made to the measuring signal by different locations on the object; and
  ascertaining, by a classifier and/or a regressor, the spatial orientation of the object based on the representation;
  predicting a trajectory of the object using the ascertained spatial orientation of the object,
  comparing the predicted trajectory of the object to a currently traveled trajectory and/or planned trajectory of the vehicle to be monitored and/or controlled; and
  in response to the predicted trajectory of the object being tangent to the currently traveled trajectory and/or to the planned trajectory of the vehicle:
    actuating a physical warning device of the vehicle which a driver of the vehicle is able to perceive, and/or
    actuating a steering system, and/or a drive system, and/or a brake system, of the vehicle, in such a way that a new trajectory of the vehicle is no longer tangent to the predicted trajectory of the object;
  wherein the measuring signal includes datasets regarding reflections of the electromagnetic interrogation radiation, and each of the datasets includes at least an angular position of the reflection, at least an intensity of the reflection, and at least a distance to a location of the reflection;
  wherein a sinc function is established for each reflection of the reflections, a peak level of the sinc function being defined by the intensity of the reflection, and a position of the sinc function is defined by the angular position of the reflection and the distance to the location of the reflection, and wherein a sum across all of the established sinc functions is utilized for the ascertainment of the representation.

\* \* \* \* \*